(12) United States Patent
Min et al.

(10) Patent No.: US 7,091,691 B2
(45) Date of Patent: Aug. 15, 2006

(54) VARIABLE SPEED MOTOR

(75) Inventors: Byoung Wook Min, Seoul (KR); Byung Keol Choi, Inchun-si (KR); Tae Hee Lee, Buchun-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/138,465

(22) Filed: May 27, 2005

(65) Prior Publication Data

US 2005/0269979 A1 Dec. 8, 2005

(30) Foreign Application Priority Data

May 28, 2004 (KR) ............... 10-2004-0038229

(51) Int. Cl.
*H02P 1/26* (2006.01)
(52) U.S. Cl. .................. 318/772; 318/773; 318/779
(58) Field of Classification Search ............ 318/772, 318/773, 779, 781, 768
See application file for complete search history.

(56) References Cited

U.S. PATENT DOCUMENTS

| | | | | |
|---|---|---|---|---|
| 2,774,924 A * | 12/1956 | Witt | ............... | 318/774 |
| 4,384,312 A * | 5/1983 | Fry | ............... | 361/24 |
| 4,467,257 A * | 8/1984 | Douthart et al. | ............ | 318/774 |
| 5,146,146 A * | 9/1992 | Samann | ............... | 318/768 |
| 5,227,710 A * | 7/1993 | Lewus | ............... | 318/781 |
| 5,333,474 A | 8/1994 | Imai et al. | | |
| 5,418,436 A | 5/1995 | Apuzzo | | |
| 5,514,943 A * | 5/1996 | Shapess | ............... | 318/772 |
| 5,883,488 A * | 3/1999 | Woodward | ............ | 318/786 |
| 6,329,783 B1 | 12/2001 | Vrionis et al. | | |
| 6,445,101 B1 * | 9/2002 | Ley | ............... | 310/184 |
| 6,707,214 B1 * | 3/2004 | Fei | ............... | 310/184 |
| 6,815,926 B1 * | 11/2004 | Fei et al. | ............... | 318/773 |
| 2001/0011877 A1 | 8/2001 | Lelkes et al. | | |

FOREIGN PATENT DOCUMENTS

DE  19642098  4/1998

OTHER PUBLICATIONS

U.S. Appl. No. 11/113,171, filed Apr. 25, 2005, to Kim et al.

* cited by examiner

*Primary Examiner*—Rina Duda
(74) *Attorney, Agent, or Firm*—Greenblum & Bernstein, P.L.C.

(57) ABSTRACT

An outer-rotor variable-speed motor, to which single-phase AC power is applied and on which a rotor is provided outside a stator, comprises first and second main windings provided on a stator of the motor to form a plurality of poles, a frequency detector for detecting the frequency of AC power applied to the motor, and a relay for connecting the first and second main windings in series if the detected frequency is 60 Hz and connecting the first and second main windings in parallel if the detected frequency is 50 Hz. The speed of the motor is kept constant even when power at different frequencies is applied, so that it is possible to reduce the manufacturing cost of the motor and reduce the power consumption, and also to reduce electromagnetic noise from the motor.

14 Claims, 8 Drawing Sheets

VARIABLE SPEED MOTOR

BACKGROUND OF THE INVENTION

1. Field of the Invention

The present invention relates to a variable speed motor, and more particularly to an outer rotor-type variable speed motor to which single phase AC power is applied, wherein the frequency of AC power applied to the motor is detected and a relay is provided to allow main windings provided in the motor to be connected in series or parallel to each other depending on whether the detected frequency is high or low, so that the motor operates to suit the frequency characteristics of the single-phase AC power.

2. Description of the Related Art

Figure 1:
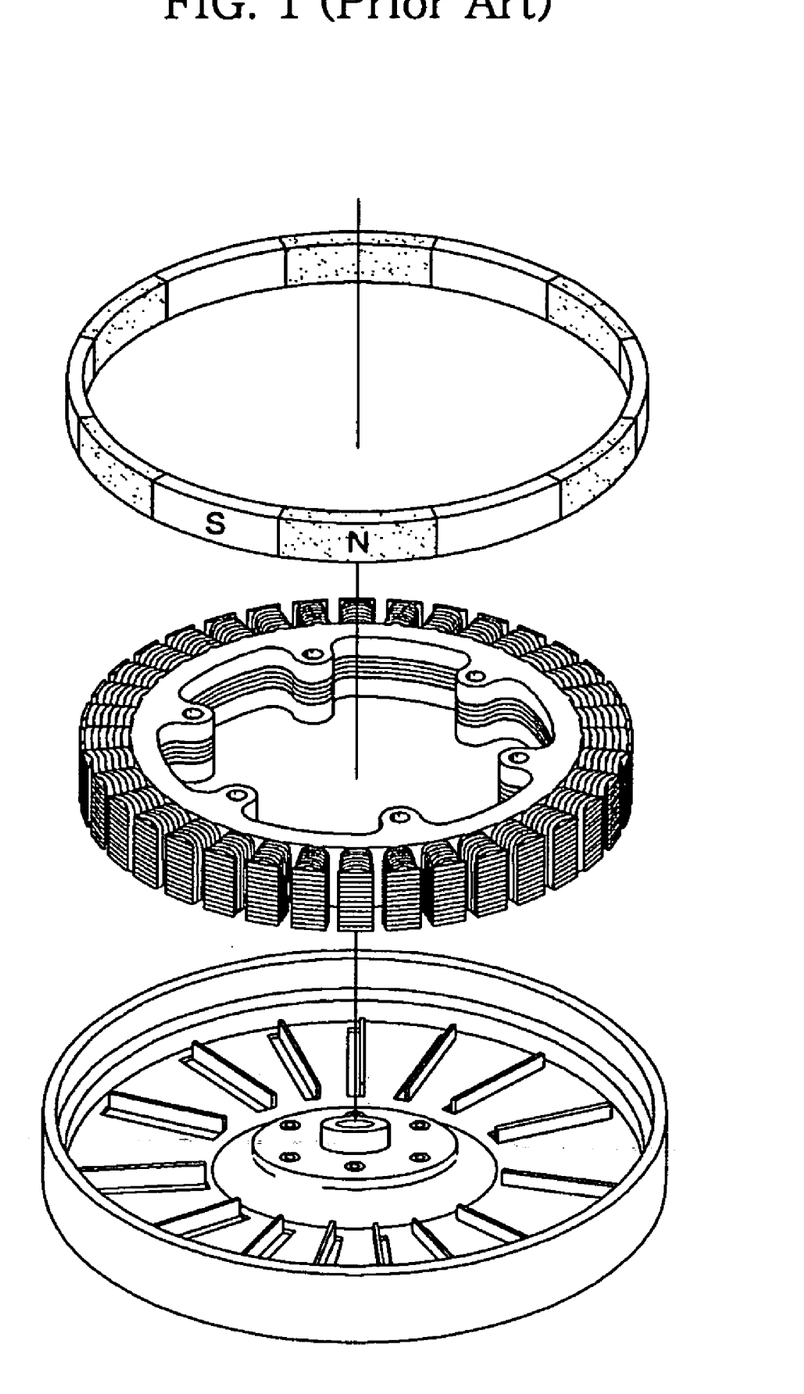
FIG. 1 is an exploded perspective view showing a rotor and a stator of a general outer rotor motor.

FIG. 1 is an exploded perspective view showing a rotor and a stator of a general outer rotor motor.

A general motor includes a stator on which windings are mounted, and a rotor on which a permanent magnet, an aluminum conductor, or a core is formed. The motor is a device that causes periodic changes in current flowing through the windings mounted on the stator and produces torque in the rotor due to periodic changes in magnetic field caused by the changes in the current, thereby attaining rotation power.

Motors are generally divided into inner and outer rotor motors according to the positions of stators and rotors. The outer rotor motor has a structure in which a rotor is positioned outside a stator as shown in FIG. 1 so that the outer rotor is rotated by changes in current flowing through windings of the stator.

Since rotors of outer rotor motors are provided outside stators, outer rotor motors have a larger turning radius than inner outer motors. Accordingly, outer rotor motors increase torque per unit volume compared to inner rotor motors. Thus, without requiring expensive start devices, outer rotor motors can be used for load for which high start torque is needed. Outer rotor motors can also be embodied to be more compact in structure than general inner rotor motors in the case where they need to produce the same torque.

General single phase induction motors require start devices, which are generally divided into split-phase start, shading coil, capacitor run, repulsion start types, etc.

Figure 2:
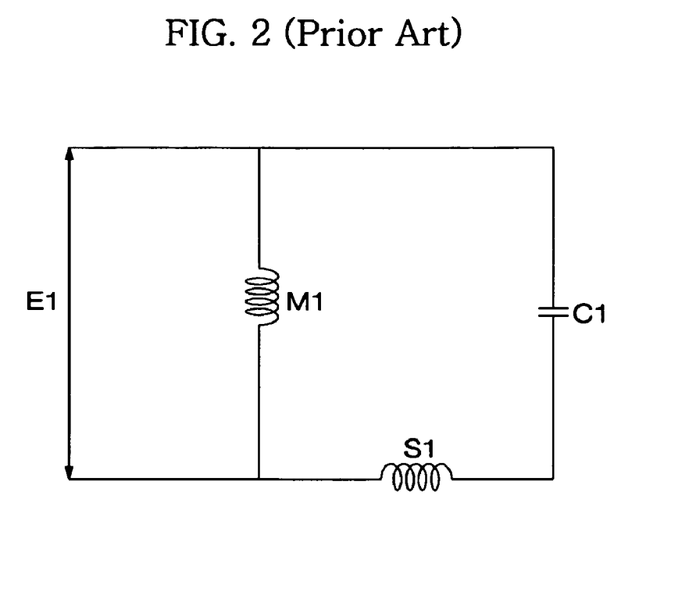
FIG. 2 is a circuit diagram showing a general capacitor-run motor.

FIG. 2 is a circuit diagram showing a general capacitor-run single-phase induction motor.

The general capacitor-run single-phase induction motor includes a main winding M1, a subsidiary winding S1, and a capacitor C1 connected in series to the subsidiary winding S1. When single phase AC power E1 is applied to the motor, the main winding M1 produces an alternating magnetic field and the subsidiary winding S1 produces a subsidiary magnetic field that is 90 electrical degrees out of phase with the alternating magnetic field produced by the main winding M1.

Since the alternating magnetic field produced by the main winding M1 and the subsidiary magnetic field produced by the subsidiary winding are 90 degrees out of phase, the two magnetic fields are not canceled but combined to generate a rotating magnetic field, thereby rotating the single-phase induction motor.

However, the general single-phase induction motor described above has a problem in that the motor speed varies depending on the frequency of AC power applied to the motor.

The rotation speed of the induction motor is determined by an equation "$n=120f/p$", where "f" is the frequency and "p" is the number of poles. The number of poles of a motor is set to a specific value when the motor is manufactured. Therefore, if a motor, which is designed to operate at a rated power frequency of 50 Hz, is used with 60 Hz power, the rotation speed of the motor is increased by 20% compared to when the motor is used with 50 Hz power.

To prevent an increase in the speed of the motor when the motor operates with 60 Hz commercial power, conventionally, an inverter circuit for changing the frequency of the applied power is attached to the motor, or an applied voltage on/off control method is employed, or a decelerator or a belt or gear is used to mechanically reduce the rotation speed of the motor.

However, these conventional methods increase the manufacturing cost of the motor or cause noise due to the electrical on/off control of the applied power or due to the mechanical deceleration, thereby reducing the efficiency of the power.

On the other hand, in the case where the conventional capacitor-run single-phase induction motor operates at a rated frequency, there may be a need to change the rotation speed of the motor to a low or high speed to suit the operating mode when the motor is applied to household electrical appliances.

When the single phase induction motor operates at the rated frequency, the motor is maintained at a constant speed corresponding to the point at which motor and load torque curves, which will be described later, meets each other, and therefore a separate apparatus must be provided to allow the speed control.

However, if the separate apparatus is provided, the manufacturing cost of the motor is increased. To overcome this problem, a pole-change single-phase induction motor, which has a relatively low manufacturing cost, is conventionally used as a motor speed control device.

Figure 3:
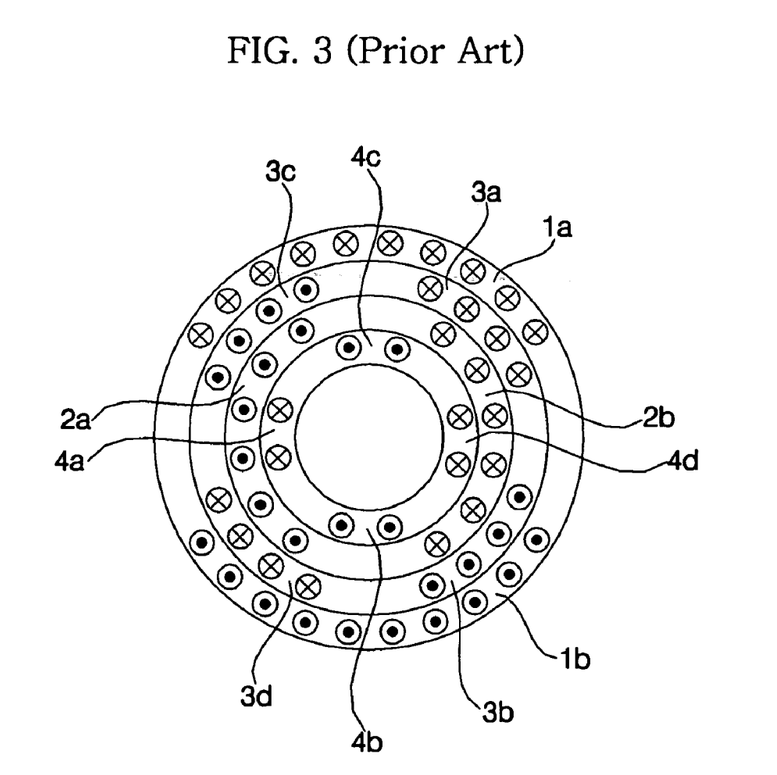
FIG. 3 is a view showing the structure of a conventional 2 pole-4 pole change single-phase induction motor.

FIG. 3 is a view showing the structure of a conventional 2 pole-4 pole change single-phase induction motor.

As shown in FIG. 3, the pole change single-phase induction motor includes four windings, i.e., a 2-pole main winding (1a, 1b), a 2-pole subsidiary winding (2a, 2b), a 4-pole main winding (3a, 3b, 3c, 3d), and a 4-pole subsidiary winding (4a, 4b, 4c, 4d) which are wound on the stator through slots thereof. The rotation speed of the motor is varied by driving the motor using the 2-pole main winding and the 2-pole subsidiary winding in 2-pole running mode and driving the motor using the 4-pole main winding and the 4-pole subsidiary winding in 4-pole running mode.

However, the conventional pole-change single-phase induction motor configured as described above has problems in that the use of the four windings for changing the number of poles increases the sectional area of the slots, significantly reducing the efficiency of the motor due to an increased core loss of the stator, and it is also difficult to increase the variable speed range since the achievable minimum variable speed is limited.

SUMMARY OF THE INVENTION

Therefore, the present invention has been made in view of the above problems, and it is an object of the present invention to provide a variable speed motor wherein, even when a commercial power frequency of 50 Hz or 60 Hz is used or 50 Hz and 60 Hz are commonly used, it is possible to control the rotation speed of the motor to be constant by switching connection states between windings mounted in the motor without a separate driving apparatus, so that it is possible to reduce the manufacturing cost, electrical vibration noise, and power consumption of the motor, and to keep the motor speed constant at different commercial frequencies, and also to change the speed when a constant voltage at a constant frequency is applied to the motor.

It is another object of the present invention to provide a variable speed motor wherein it is possible to change the rotation speed within a specific range by switching connection states between windings provided in the motor without a separate speed change apparatus when the motor operates at a rated frequency, thereby reducing the manufacturing cost of the motor and improving the durability of the motor.

In accordance with one aspect of the present invention, the above and other objects can be accomplished by the provision of a variable speed motor comprising a plurality of main windings wound on a stator of the motor to form a plurality of poles; and a relay for switching connection states of the main windings to allow the main windings to be connected in series or parallel according to a frequency of AC power applied to the motor.

In accordance with another aspect of the present invention, there is provided a variable speed motor comprising a frequency detector for detecting a frequency of AC power applied to the motor; first and second main windings provided on a stator of the motor to form a plurality of poles; and a relay for connecting the first and second main windings in series if the detected frequency is 60 Hz and connecting the first and second main windings in parallel if the detected frequency is 50 Hz.

In accordance with yet another aspect of the present invention, there is provided a variable speed motor comprising a plurality of main windings wound on a stator of the motor to form a plurality of poles; and a relay for allowing the main windings to be connected in series/parallel to increase a variable rotation speed range of the motor.

Preferably, the relay connects the main windings in parallel if the motor rotates at a high speed and connects the main windings in series if the motor rotates at a low speed.

The present invention employs an outer rotor motor as the variable speed motor and keeps the rotation speed of the motor constant through switching between series and parallel connections of the windings even when power at different frequencies is applied to the motor. Thus, it is possible to prevent breakage of the motor due to an increase in temperature caused by an increase speed of the motor. Since the motor speed is controlled without a separate inverter circuit or decelerator, it is possible to reduce the manufacturing cost of the motor and reduce electromagnetic vibration noise.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of a variable speed motor according to the present invention will now be described with reference to the accompanying drawings.

The variable speed motor according to the present invention is a single-phase induction motor to which single-phase AC power is applied. If the motor is an outer rotor motor in which a rotor is provided outside a stator, it has a larger turning radius than an inner rotor motor, so that higher torque is produced per unit volume, thereby making it possible to much further increase low and high rotation speed ranges of the motor according to series/parallel winding connection states, which will be described later.

Figure 4:
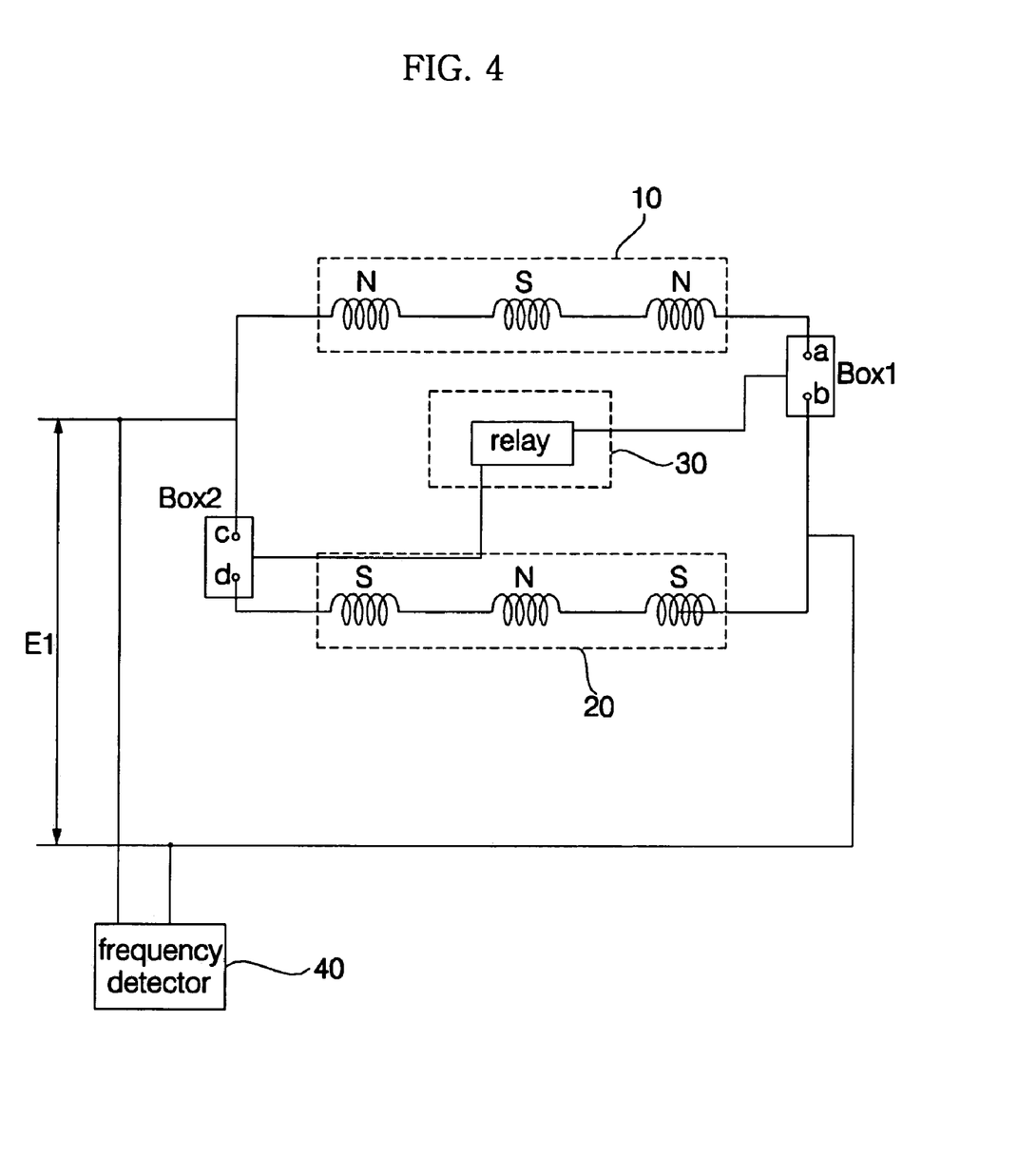
FIG. 4 is a circuit diagram showing a variable speed motor according to the present invention.

FIG. 4 is a circuit diagram showing a variable speed motor according to a preferred embodiment of the present invention.

As shown in FIG. 4, the variable speed motor according to the preferred embodiment of the present invention comprises a first main winding 10, a second main winding 20, and a relay 30 for connecting the first and second windings 10 and 20 to each other in either parallel or series. Single phase AC power (E1) at a constant frequency is applied to the motor. The variable speed motor may further comprise a frequency detector 40 for detecting the frequency of the power applied to the motor.

The variable speed motor is a six-pole motor since it forms three poles for each of the two main windings. The motor may be of any other number of poles such as 2 or 4 poles.

The rated frequency of the applied AC power may be set differently depending on the countries. In general, when power at a frequency of 60 Hz is applied, the motor rotates at a higher speed than when power at a frequency of 50 Hz is applied by 20% since the rotation speed of the motor increases in proportion to the frequency of the applied power.

When AC power at a different frequency is applied as described above, the frequency detector 40 detects the frequency, and the relay 30 allows the first main winding 10 and the second main winding 20 to be connected in either parallel or series according to the detected frequency, so as to keep the rotation speed of the motor constant.

The relay 30 controls both the connection states of nodes a and b of a connection board in a box Box1 and the connection states of nodes c and d of a connection board in a box Box2 to switch the connections states of the main windings. When AC power at a low frequency of 50 Hz is applied, the relay 30 allows the first main winding 10 and the second main winding 20 to be connected in parallel to each other to increase the rotation speed of the motor. To accomplish this, the relay 30 controls the first and second boxes Box1 and Box2 so that the nodes a and b in the connection board in the box Box1 are connected to each other and the nodes c and d in the connection board in the box Box2 are connected to each other.

When AC power at a high frequency of 60 Hz is applied, the relay 30 allows the first main winding 10 and the second main winding 20 to be connected in series to each other to reduce the rotation speed of the motor. To accomplish this, the relay 30 controls the first and second boxes Box1 and Box2 so that the node a in the connection board in the box Box1 is connected to the node d in the connection board in the box Box2. The connection state control operation of the relay 30 allows the motor to change its rotation speed without a separate driving apparatus.

A more detailed description will now be given, with reference to FIGS. 5a and 5b, of the series/parallel connection states of the windings according to the control operation of the relay.

Figure 5A:
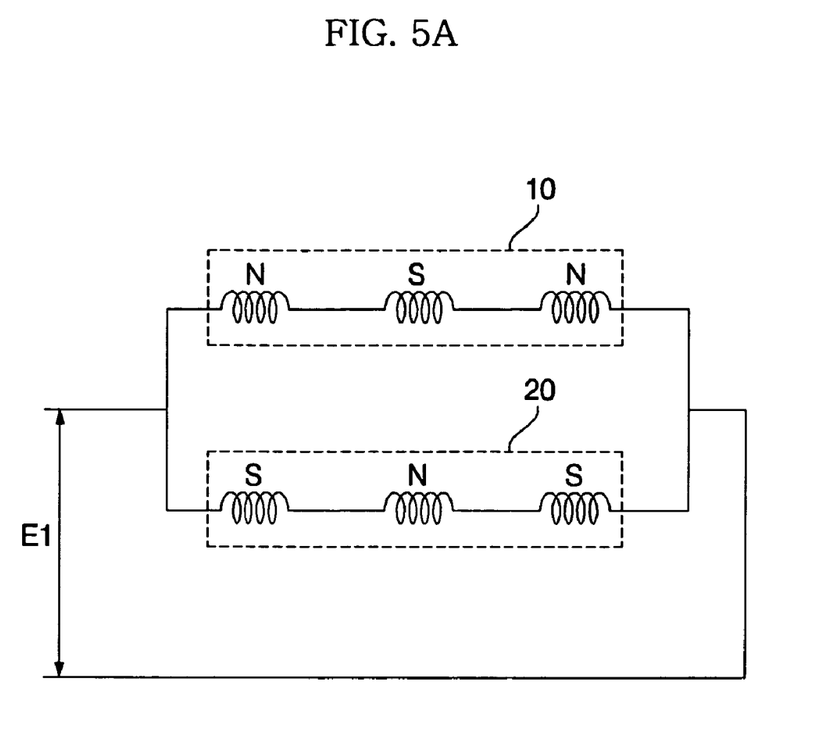
FIGS. 5a and 5b are circuit diagrams showing series/parallel connection states of windings of the variable speed motor according to the present invention.
Figure 5B:
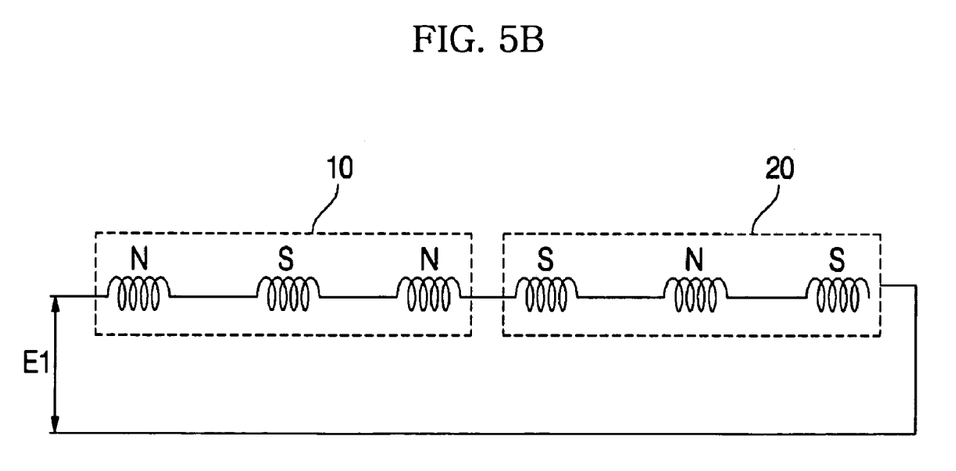

FIGS. 5a and 5b are circuit diagrams showing series/parallel connection states of the windings of the motor according to the present invention. FIG. 5a shows the circuit when the first and second main windings 10 and 20 are connected in parallel by the relay 30, and FIG. 5b shows the circuit when the first and second main windings 10 and 20 are connected in series by the relay 30.

If the frequency of the AC power applied to the motor is 50 Hz and the applied AC voltage is 220V, the relay connects the main windings in parallel to each other as shown in FIG. 5a so that 220V is applied to each main winding.

If the frequency of the AC power applied to the motor is 60 Hz, the relay connects the main windings in series to each other as shown in FIG. 5b so that 110V is applied to each main winding.

If the voltage applied to each winding varies, the current flowing through each winding varies, so that the strength of magnetic field produced by the varying current varies, thereby inducing a current in the rotor. The induced current produces rotation torque to cause the rotor to rotate. Since the rotation torque is proportional to the amplitude of the applied voltage, the rotation speed of the motor when the windings are connected in parallel is higher than that when the windings are connected in series.

The control operation of the relay 30 associates an increase in the rotation speed of the motor due to power at 60 Hz applied to the motor with a decrease in the rotation speed due to the serial connection of the windings, and associates a decrease in the rotation speed of the motor due to power at 50 Hz applied to the motor with an increase in the rotation speed due to the parallel connection of the windings, thereby keeping the rotation speed of the motor constant.

As described above, in the case where AC power at different commercial frequencies may be applied to the motor to rotate the motor, if AC power at 60 Hz is applied to the motor, the rotation speed of the motor is increased in proportion to the frequency, thereby increasing the temperature of the motor, which may lead to breakage of the motor. To prevent this problem, it is essential to increase the volume of the motor. Accordingly, while employing the winding connection control by the relay 30, the present invention adopts an outer rotor structure for the motor, so that higher torque is produced per unit volume, thereby achieving a reduction in the volume of the motor and the level of noise occurring therein.

The variable speed motor according to the present invention can be applied to dishwashers, drying apparatuses, clothes driers, or clothes washers. Particularly, when the present invention is applied to clothes washers, the present invention allows the motor to have the same rotation speed even when AC power at different frequencies is applied to the motor. A description of the relationship between the rotation speed of the motor and torque produced in the motor according to the series/parallel connection states of the windings and the commercial frequencies of the applied power will now be given with reference to FIGS. 6a to 6d.

Figure 6A:
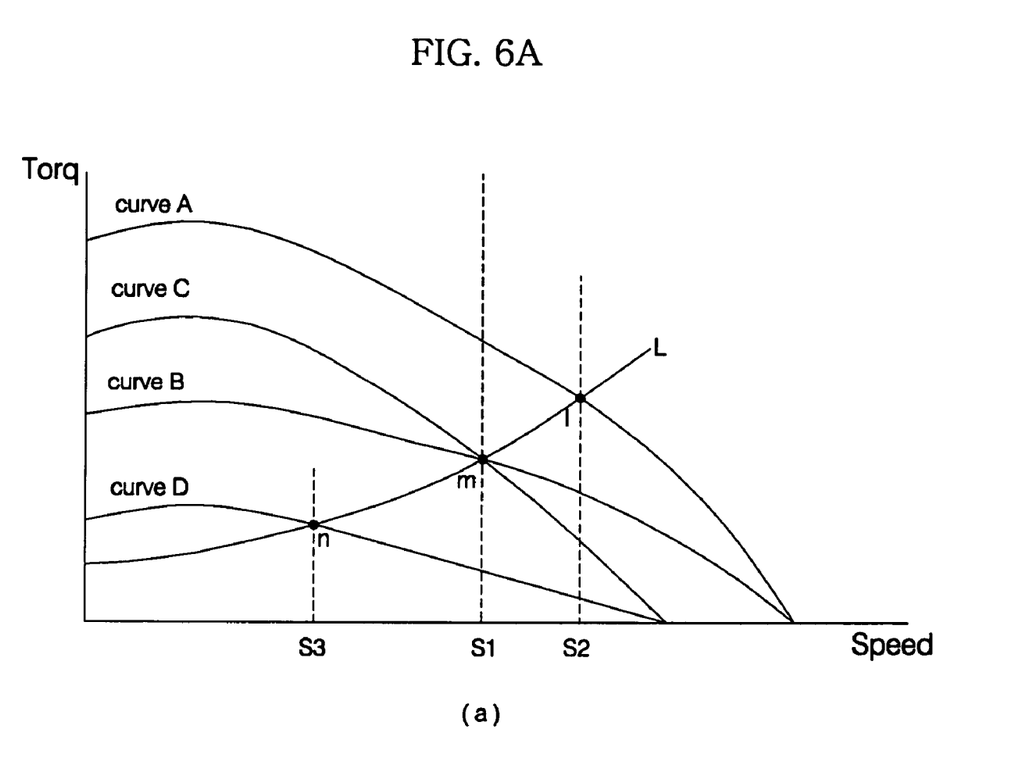
FIGS. 6a to 6d are graphs showing the rotation speed and torque of the variable speed motor according to the present invention.
Figure 6B:
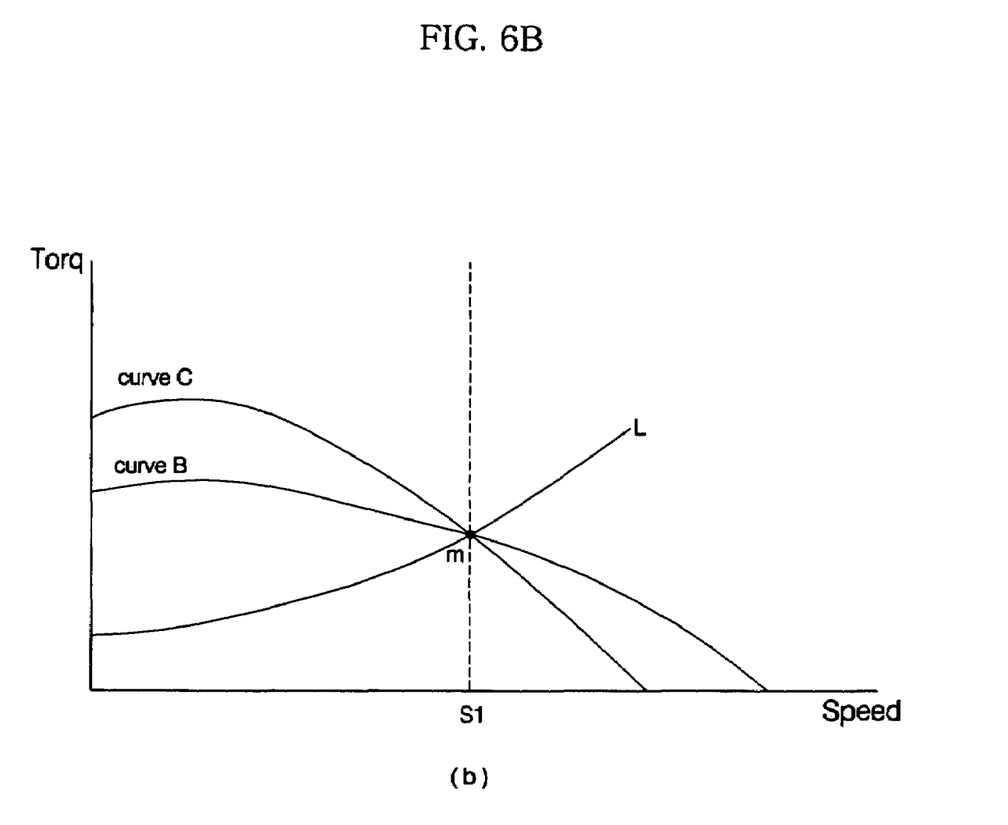
Figure 6C:
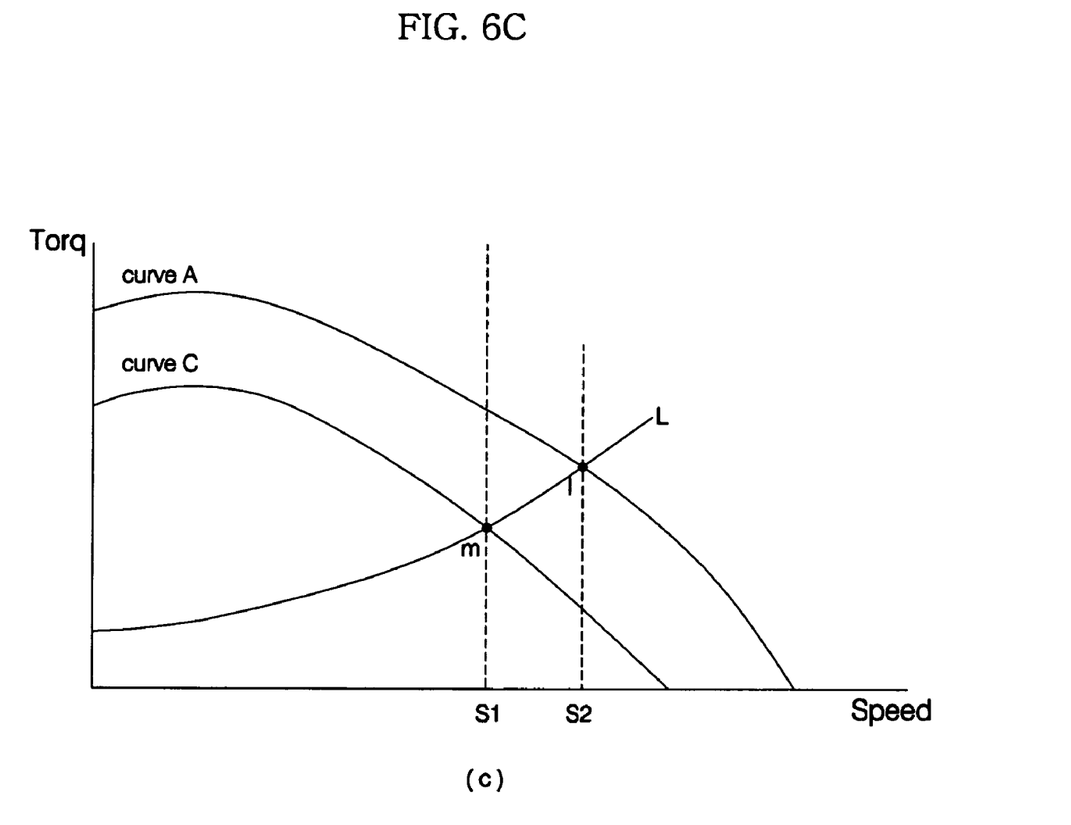
Figure 6D:
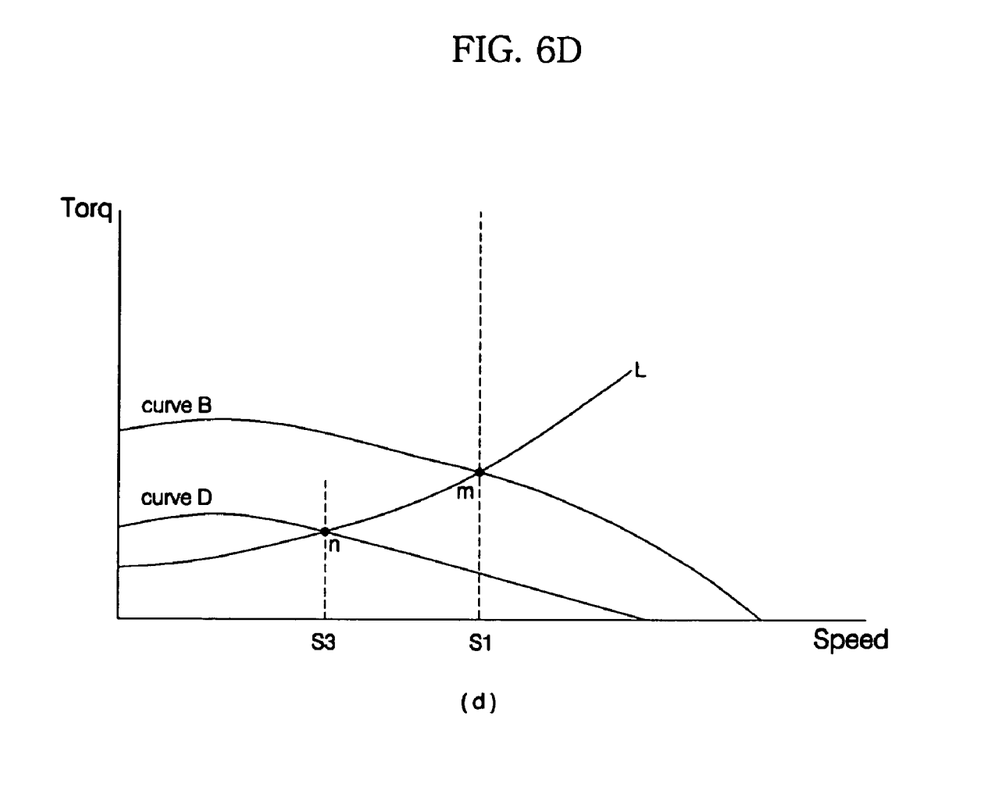

FIG. 6a is a graph showing the overall relationship between the rotation speed and the torque of the motor according to the present invention, FIG. 6b is a graph showing the relationship therebetween only for the case where AC power different frequencies is applied to the motor, and FIGS. 6c and 6d are graphs showing the variable speed range of the motor when power at a rated frequency is applied to the motor.

A curve A in FIGS. 6a to 6d represents the relationship between the rotation speed of the motor and the torque produced therein in the case where AC power at a frequency of 60 Hz is applied to the motor and the windings are connected in parallel, and a curve B represents the relationship therebetween in the case where power at the same frequency is applied to the motor and the windings are connected in series.

A curve C in FIGS. 6a to 6d represents the relationship between the rotation speed of the motor and the torque produced therein in the case where AC power at a frequency of 50 Hz is applied to the motor and the windings are connected in parallel, and a curve D represents the relationship therebetween in the case where power at the same frequency is applied to the motor and the windings are connected in series.

Rotating the motor requires applying a certain amount of torque to load connected to the motor. The amount of torque required for the load is represented by a load torque curve L in the graphs.

In the case where the frequency of commercial AC power applied to the motor varies and a clothes washer, to which the motor is applied, carries outs dry cycle, the relay causes main windings provided in the motor to be connected in parallel if AC power at a frequency of 50 Hz is applied to the clothes washer. Here, the torque curve C of the motor meets the load curve L at a point m, so that the clothes washer performs the dry cycle at a specific speed S1.

If the frequency detector 40 detects that the frequency of the applied power is 60 Hz, the relay switches the connection state of the main windings to series connection. Accordingly, the torque curve B of the motor meets the load curve L at the point m. This allows the clothes washer to perform the dry cycle at the specific speed S1 even when the frequency of the applied power varies.

If the power applied to the clothes washer has a rated frequency of 50 Hz or 60 Hz, the main windings of the motor are connected in series or parallel to change the speed according to wash or dry cycle, as shown in FIGS. 5c and 5d.

Specifically, if the main windings of the motor are connected in parallel, the torque curve A or C meets the load curve L at the point I or m so that the motor rotates at a relatively high speed of S2 or S1. On the other hand, if the main windings of the motor are connected in series, the torque curve B or D meets the load curve L at the point m or n so that the motor rotates at a relatively low speed of S or S3.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Application No. 10-2004-0038229, filed on May 28, 2004, the contents of which are herein expressly incorporated by reference in its entirety.

What is claimed is:

1. A variable speed motor comprising:
  a plurality of main windings wound on a stator of the motor to form a plurality of poles; and a relay for switching connection states of the main windings to allow the main windings to be connected in series or parallel according to a frequency of AC power applied to the motor.

2. The variable speed motor according to claim 1, wherein the motor forms 6 poles through the main windings.

3. The variable speed motor according to claim 1, wherein the motor is an outer rotor motor to which single phase AC power is applied.

4. The variable speed motor according to claim 1, wherein the motor is a motor for use in clothes driers.

5. The variable speed motor according to claim 1, wherein the motor is a motor for use in dishwashers.

6. The variable speed motor according to claim 1, wherein the motor is a motor for use in clothes washers.

7. The variable speed motor according to claim 1, wherein, during dry cycle, the relay switches connection states of the main windings so that the motor rotates at a constant speed.

8. A variable speed motor comprising:
   first and second main windings provided on a stator of the motor to form a plurality of poles;
   a frequency detector for detecting a frequency of AC power applied to the motor; and
   a relay for connecting the first and second main windings in series if the frequency detected by the frequency detector is 60 Hz and connecting the first and second main windings in parallel if the frequency detected by the frequency detector is 50 Hz.

9. The variable speed motor according to claim 8, wherein the motor forms 6 poles through the main windings.

10. The variable speed motor according to claim 8, wherein the motor is an outer rotor motor to which single phase AC power is applied.

11. The variable speed motor according to claim 8, wherein the motor is a motor for use in clothes driers.

12. The variable speed motor according to claim 8, wherein the motor is a motor for use in dishwashers.

13. The variable speed motor according to claim 8, wherein the motor is a motor for use in clothes washers.

14. The variable speed motor according to claim 8, wherein, during dry cycle, the relay switches connection states of the main windings so that the motor rotates at a constant speed.

* * * * *